United States Patent
Predmore, II et al.

(10) Patent No.: US 9,693,111 B2
(45) Date of Patent: Jun. 27, 2017

(54) VIDEO TRANSMISSION SYSTEM

(71) Applicant: UTC FIRE & SECURITY CORPORATION, Farmington, CT (US)

(72) Inventors: Thomas J. Predmore, II, Albany, OR (US); Srivallabha Kommareddy, Hyderabad (IN)

(73) Assignee: UTC FIRE & SECURITY CORPORATION, Farmington, CT (US)

( * ) Notice: Subject to any disclaimer, the term of this patent is extended or adjusted under 35 U.S.C. 154(b) by 0 days.

(21) Appl. No.: 14/325,971

(22) Filed: Jul. 8, 2014

(65) Prior Publication Data

US 2015/0012953 A1  Jan. 8, 2015

Related U.S. Application Data

(60) Provisional application No. 61/843,670, filed on Jul. 8, 2013.

(51) Int. Cl.
*H04N 7/18* (2006.01)
*H04N 5/77* (2006.01)
*H04N 21/6402* (2011.01)
*H04N 21/414* (2011.01)
*H04N 21/41* (2011.01)
*H04N 21/44* (2011.01)
*H04L 29/12* (2006.01)

(52) U.S. Cl.
CPC ..... *H04N 21/6402* (2013.01); *H04L 61/2007* (2013.01); *H04N 21/4108* (2013.01); *H04N 21/41422* (2013.01); *H04N 21/44008* (2013.01); *H04L 61/1511* (2013.01)

(58) Field of Classification Search
CPC .................. H04N 21/41422; H04N 21/44008
See application file for complete search history.

(56) References Cited

U.S. PATENT DOCUMENTS

| | | |
|---|---|---|
| 5,862,404 A | 1/1999 | Onaga |
| 6,249,814 B1 | 6/2001 | Shaffer et al. |
| 6,269,099 B1 | 7/2001 | Borella et al. |
| 6,490,617 B1 | 12/2002 | Hemphill et al. |
| 6,496,859 B2 | 12/2002 | Roy et al. |
| 6,611,863 B1 | 8/2003 | Banginwar |
| 6,775,244 B1 | 8/2004 | Hattig |
| 6,801,507 B1 | 10/2004 | Humpleman et al. |

(Continued)

FOREIGN PATENT DOCUMENTS

WO  2011137100 A1  11/2011

OTHER PUBLICATIONS

Doms, "Dynamic Host Configuration Protocol", IETF RFC 2131, Mar. 1997.*

*Primary Examiner* — James R Marandi
(74) *Attorney, Agent, or Firm* — Cantor Colburn LLP

(57) ABSTRACT

A video analysis system includes memory having stored therein video analysis software and a processor configured to execute the video analysis software to receive from a mobile video system a dynamic network address, to associate the dynamic network address with a unique identifier of the mobile video system in the memory, and to communicate with the mobile video system using the dynamic network address based on selection by a user of the unique identifier.

12 Claims, 2 Drawing Sheets

(56) References Cited

U.S. PATENT DOCUMENTS

| | | |
|---|---|---|
| 7,024,476 B1 | 4/2006 | Page et al. |
| 7,035,257 B2 | 4/2006 | Vafaei |
| 7,069,312 B2 | 6/2006 | Kostic et al. |
| 7,103,686 B1 | 9/2006 | Lin et al. |
| 7,197,565 B2 | 3/2007 | Abdelaziz et al. |
| 7,225,243 B1 | 5/2007 | Wilson |
| 7,490,293 B1 | 2/2009 | Humpleman et al. |
| 7,554,959 B1 | 6/2009 | Dowling |
| 7,616,594 B2 | 11/2009 | Roberts et al. |
| 7,706,369 B2 | 4/2010 | Roese et al. |
| 7,729,284 B2 | 6/2010 | Ukrainetz et al. |
| 7,869,382 B2 | 1/2011 | Hamedi et al. |
| 7,920,467 B2 | 4/2011 | Gilmour |
| 7,949,358 B2 | 5/2011 | Wentink et al. |
| 8,130,674 B2 | 3/2012 | Plotnik et al. |
| 2005/0251576 A1 | 11/2005 | Weel |
| 2007/0220569 A1* | 9/2007 | Ishii ............................ 725/105 |
| 2008/0102854 A1* | 5/2008 | Yi .................... H04L 29/12283 455/456.1 |
| 2008/0304408 A1 | 12/2008 | Kraemer et al. |
| 2009/0198797 A1 | 8/2009 | Wang et al. |
| 2010/0033573 A1* | 2/2010 | Malinovski et al. ......... 348/158 |
| 2010/0034130 A1 | 2/2010 | So et al. |
| 2010/0312875 A1 | 12/2010 | Wilerson et al. |
| 2011/0013018 A1* | 1/2011 | Leblond ....................... 348/143 |
| 2011/0063443 A1* | 3/2011 | Yang ............................ 348/148 |
| 2011/0103344 A1 | 5/2011 | Gundavelli et al. |
| 2011/0275370 A1 | 11/2011 | Skov et al. |
| 2011/0317586 A1 | 12/2011 | Palanki et al. |
| 2011/0320585 A1 | 12/2011 | Pope et al. |
| 2012/0011247 A1 | 1/2012 | Mallik et al. |
| 2012/0079019 A1 | 3/2012 | Miettinen et al. |
| 2012/0131153 A1 | 5/2012 | Schmidt et al. |
| 2012/0249372 A1 | 10/2012 | Jovicic et al. |
| 2012/0284757 A1 | 11/2012 | Rajapakse |
| 2013/0005256 A1 | 1/2013 | Koehler |

* cited by examiner

VIDEO TRANSMISSION SYSTEM

BACKGROUND OF THE INVENTION

Embodiments of the present invention relate to video transmission and in particular to a mobile video recording system that connects to different wireless networks.

Mobile video recording and storage devices may connect to several network sites throughout an operational day. The networks may implement different device identification methods, so methods are needed that allow the mobile devices to communicate with each of the networks. One conventional method of identifying mobile devices on a network is to provide the device with a static network address. In such a case, each separate network would need to have a way of tracking each mobile device that may be connected to the network, even if the device is not presently connected to the network. In addition, each separate network would have to be configured to support identification of static network addresses.

Another conventional method of identifying mobile devices on a network includes use of a Dynamic Host Configuration Protocol (DHCP) in which a temporary identification number is assigned to devices when they log in to a network. The DHCP utilizes a domain name system (DNS) which manages the assignment of the temporary identification numbers to the devices. Utilizing the DNS, network devices are able to find other network devices by searching for a machine name without having to keep track of the network devices' temporary identification numbers. However, introduction of a DNS requires additional hardware and manpower to manage the system.

BRIEF DESCRIPTION OF THE INVENTION

Embodiments of the present invention include a video analysis system. The video analysis system includes memory having stored therein video analysis software and a processor configured to execute the video analysis software to receive from a mobile video system a dynamic network address, to associate the dynamic network address with a unique identifier of the mobile video system in the memory, and to communicate with the mobile video system using the dynamic network address based on selection by a user of the unique identifier.

Embodiments of the invention further include a method associating devices of a video transmission network. The method includes receiving from a mobile video recording system a first dynamic network address and a unique identifier of the mobile video recording system and associating the first dynamic network address with the unique identifier in a video analysis system. The method includes receiving video at the video analysis system from the mobile video recording system and associating the video with the unique identifier in memory.

Embodiments of the invention further include a method for associating devices of a video transmission network. The method includes receiving from a mobile video recording system a dynamic network address and a unique identifier of the mobile video recording system. The method includes associating, with a video analysis system, the dynamic network address with the unique identifier in a video analysis system and detecting, by the video analysis system, a user selection of the unique identifier. The method also includes initiating communications with the mobile video recording system using the dynamic network address based on detecting the user selection of the unique identifier

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Mobile video recording systems connect to various networks over a period of time. Embodiments of the invention provide for systems, methods and devices to assign dynamic addresses to the mobile video recording systems and to keep track of current dynamic addresses by video analysis software in a video analysis system.

Figure 1:
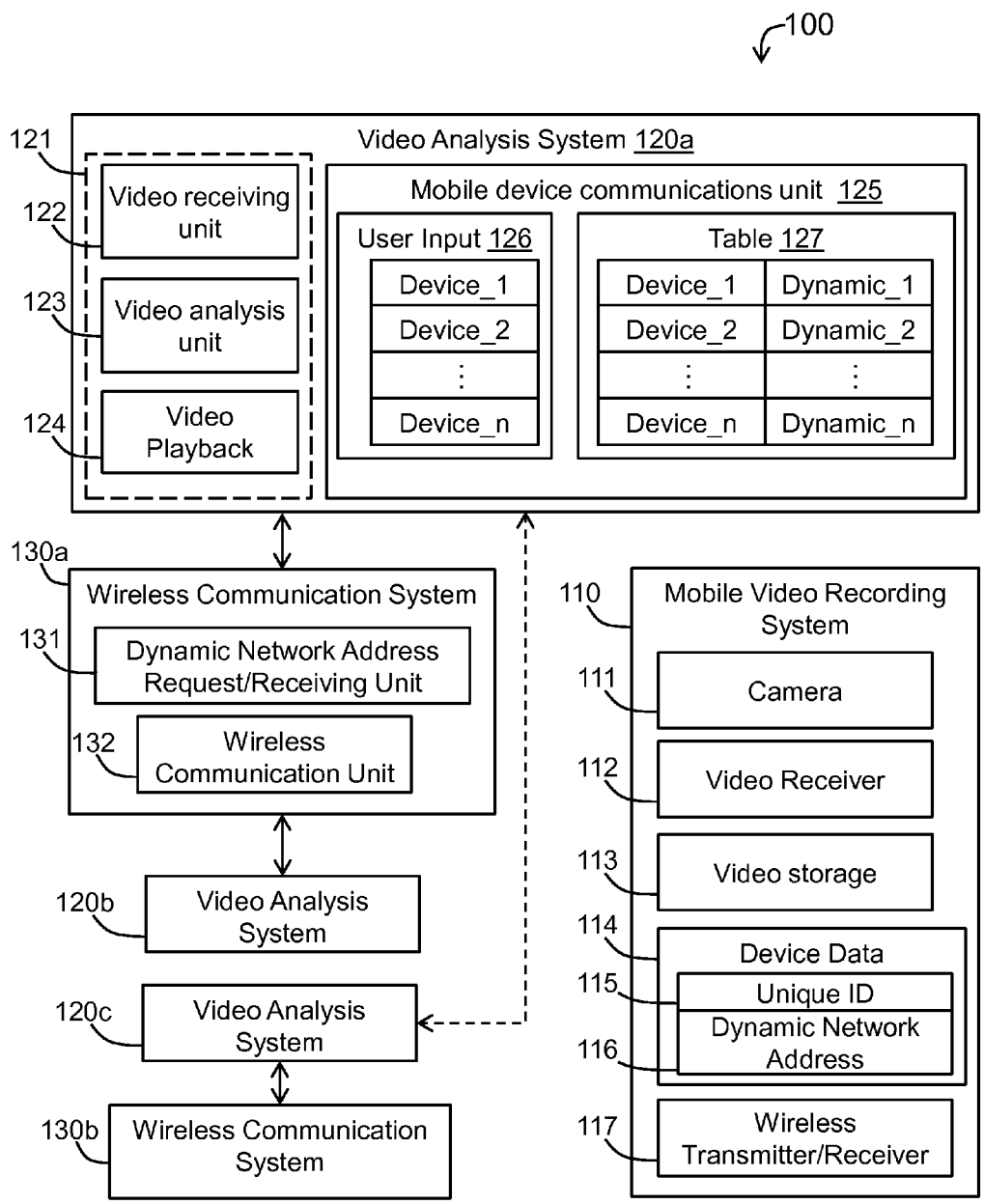
FIG. 1 illustrates video recording and transmission system according to one embodiment of the invention.

FIG. 1 is a diagram of a video recording and transmission system 100 according to an embodiment of the invention. The system 100 includes a mobile video recording system 110, a video analysis system 120a and a wireless communications system 130a. The mobile video recording system 110 may be mounted in a vehicle, may be part of a handheld device, or may include any other manner of recording and storing video in a mobile environment. The mobile video recording system 110 includes a camera 111 to capture video images, a video receiver 112 to receive the video images and process the video images, such as by compressing, formatting, organizing the video images, or performing any other function on the video images. While the mobile video recording system 110 of FIG. 1 is illustrated as including a camera 111 for recording images, embodiments of the invention also encompass a mobile video system that may not have a camera for recording the video, but instead receives and stores video from another device or system.

The mobile video recording system 110 also includes video storage 113 to store the video images. The video storage 113 may include any type of memory, including volatile memory non-volatile memory, disk memory, solid state memory, etc. The mobile video recording system 110 also includes device data 114, such as a unique identifier 115 of the mobile video recording system 110 and a dynamic network address 116 of the mobile video recording system 110. The unique identifier may be a name of the mobile video recording system 110 that readily identifies the mobile video recording system 110. For example, if there are twenty vehicles in a fleet, and each vehicle has installed a mobile video recording system 110, the names of the mobile video recording systems 110 may be "Vehicle 1" through "Vehicle 20." In embodiments of the invention, the unique identifier 115 does not change over time as the mobile video recording system 110 connects to different wireless communication systems. On the other hand, the dynamic network address 116 may change each time the mobile video recording system 110 communicates with a different wireless communications system.

The mobile video recording system 110 also includes a wireless transmitter/receiver 117, which may include an antenna and supporting circuitry to process data for wireless transmission and to process data that is received wirelessly. The wireless transmitter/receiver 117 may include program code configured to control a processor to generate a unicast signal, a multicast signal, or a broadcast signal to devices on a network to which the mobile video recording system 110 is connected. The unicast, multicast and broadcast signals may include identification data, including the unique identifier 115 and dynamic network address 116, as well as a device type, capability sets of the mobile video recording system 110, health and diagnostic data, and any other data. In one embodiment, the unicast, multicast or broadcast signal is re-transmitted by the mobile video recording system 110 at regular intervals.

The video analysis system 120a may be a computer including one or more processors, memory, logic circuitry and other circuitry. The video analysis system 120a is a stationary device, structure, apparatus or system, or a device that is configured to operate when stationary and is not configured to operate while moving from one place to another. The video analysis system 120a includes video analysis software 121, which may be stored in memory of the video analysis system 120a and executed by a processor of the video analysis system 120a. The video analysis software 121 includes a video receiving unit 122 configured to receive and process video from a source external to the video analysis system 120a, a video analysis unit 123 to analyze content of the video, and a video playback unit 124 to control playback of the video. For example, in one embodiment a video is received from a source external to the video analysis system 120a and the video is played back on the video playback unit 124 to generate a display visible by a user. The user may then perform operations, including playback and transmission of the video, on the video analysis system 120a.

The video analysis system 120a also includes a mobile device communications unit 125. The mobile device communications unit 125 includes a user input unit 126 configured to generate a display including device selection icons for use by a user. The mobile device communications unit 125 also includes a table 127 that matches a unique identifier, such as a device name, with a dynamic network address, such as a dynamic Internet protocol (IP) address. When a user selects a device icon in the user input 126, the mobile device communications unit 125 initiates communications with the corresponding mobile video recording system 110 via a wireless communications system 130a. The wireless communications system 130a may be a wireless communication network or may be part of a larger wireless communication network.

The wireless communication system 130a includes a dynamic network address request/receiving unit 131 to request and/or receive the unique identifier and dynamic network address information from the mobile video recording system 110. The wireless communication system 130a also includes a wireless communication unit 132, such as an antenna.

Operation of the video recording and transmission system 100 will be described with respect to FIGS. 1 and 2. When the mobile video recording system 110 comes within range of the wireless communications system 130a in block 201, the wireless transmitter/receiver 117 of the mobile video recording system 110 may transmit identification data to the wireless communication system 130a in block 202. If the video recording system 110 requires assignment of a dynamic Internet protocol (IP) address, transmitting the identification information includes a request for the dynamic Internet protocol (IP) address. The wireless communication system 130a receives the information and request in block 203 and the dynamic network address request/receiving unit 131 of the wireless communication system 130a supplies a dynamic network address to the mobile video recording system 110 in block 204 to permit the mobile video recording system 110 to communicate with other devices connected to the wireless communication system 130a. The mobile video recording system 110 receives the dynamic network address in block 205 and stores the dynamic network address 116.

In block 206, the mobile video recording system 110 transmits a unicast, multicast or broadcast signal over the wireless communication system 130a to the video analysis system 120a. The unicast, multicast or broadcast signal includes identification information including a name or identification number of the mobile video recording system 110 and the dynamic network address of the mobile video recording system. The mobile video recording system 110 may also transmit information regarding the device or system type of the mobile video recording system 110, capability sets of the mobile video recording system 110, health and diagnostic data, and any other data. In embodiments of the invention, the name of the mobile video recording system 110 is a static and unique identifier that does not change as the mobile video recording system 110 connects to different wireless communication systems over time.

The video analysis system 120a receives the identification information from the mobile video recording system 110 in block 207, and in block 208 the video analysis system 120a associates the received dynamic network address with the name of the mobile video recording system 110 in memory of the video analysis system 120a. In one embodiment, the video analysis system 120a maintains a table of the names of each mobile video recording system 110, whether or not the listed mobile video recording system is presently connected to a wireless communication system. The table may include the last-received dynamic network address for the listed mobile video recording systems, or the system may delete dynamic network addresses for the listed mobile video recording systems based on determining that the systems have disconnected from a wireless communication system. When the mobile video recording system 110 provides a dynamic network address to the video analysis system 120a, the video analysis system 120a updates the table by over-writing a previously-provided dynamic network address, or by entering the dynamic network address in an empty cell associated with the mobile video recording unit 110, based on the name provided by the mobile video recording unit 110.

In block 209, a user may select a name of a mobile video recording unit 110 to perform an action, such as downloading video, analyzing downloaded video, receiving information regarding the status of the mobile video recording system 110 or performing any other function. The user may select the name of the mobile video recording unit 110 by typing the name into a user interface generated by the video analysis software 121 or by selecting the name from a list of names provided by the video analysis software 121, for example. In one embodiment, the user interface includes an electronic display of information on a computer display, and the selection includes manipulation of a user input, such as a mouse, touch-screen, keyboard, or any other selection mechanism.

Based on the user selection of the name in block 209, the video analysis software 121 refers to the table 127 to obtain the dynamic network address of the mobile video recording system 110 in block 210. In block 211, the video analysis system 120a transmits a communication to the mobile video recording system 110 to perform the requested action. In FIG. 2, the requested action is described as a request to transmit video; however, embodiments of the invention encompass any requested action, including requests for data or commands to control operation of components of the mobile video recording system 110.

In block 212, the mobile video recording system 110 receives the request via the wireless communication system 130a. In block 213, the mobile video recording system 110 responds to the request by transmitting the requested video to the video analysis system 120a which receives the video in block 214. In block 215, the video analysis system 120a associates the received video with the name of the mobile video recording system 110 in memory of the video analysis system 120a, and in block 216, the video analysis system analyzes the video, or a user analyzes the video using the video analysis system 120a.

During the course of time, such as over the course of hours of a day, or over the course of days, the mobile video recording system 110 may move around geographically and come into communication with multiple wireless communication systems, represented by the wireless communication systems 130a and 130b of FIG. 1. Each wireless communication system 130a and 130b may be within communications range of different video analysis systems. For example, in FIG. 1, the wireless communication system 130a provides a communications network for the video analysis systems 120a and 120b, such that a mobile video recording system 110 connected to the wireless communication system 130a may access each of the video analysis systems 120a and 120b. The wireless communication system 130b provides a communications network for the video analysis system 120c, such that a mobile video recording system 110 connected to the wireless communication system 130b may access only the video analysis system 120c. In one embodiment, as illustrated by the dashed arrow of FIG. 1, multiple video analysis stations 120a and 120c may also be connected to each other via communications channels other than the wireless communication systems 130a and 130b, such as via telephone, Internet, satellite or other networks, to transmit information between video analysis systems.

Figure 2:
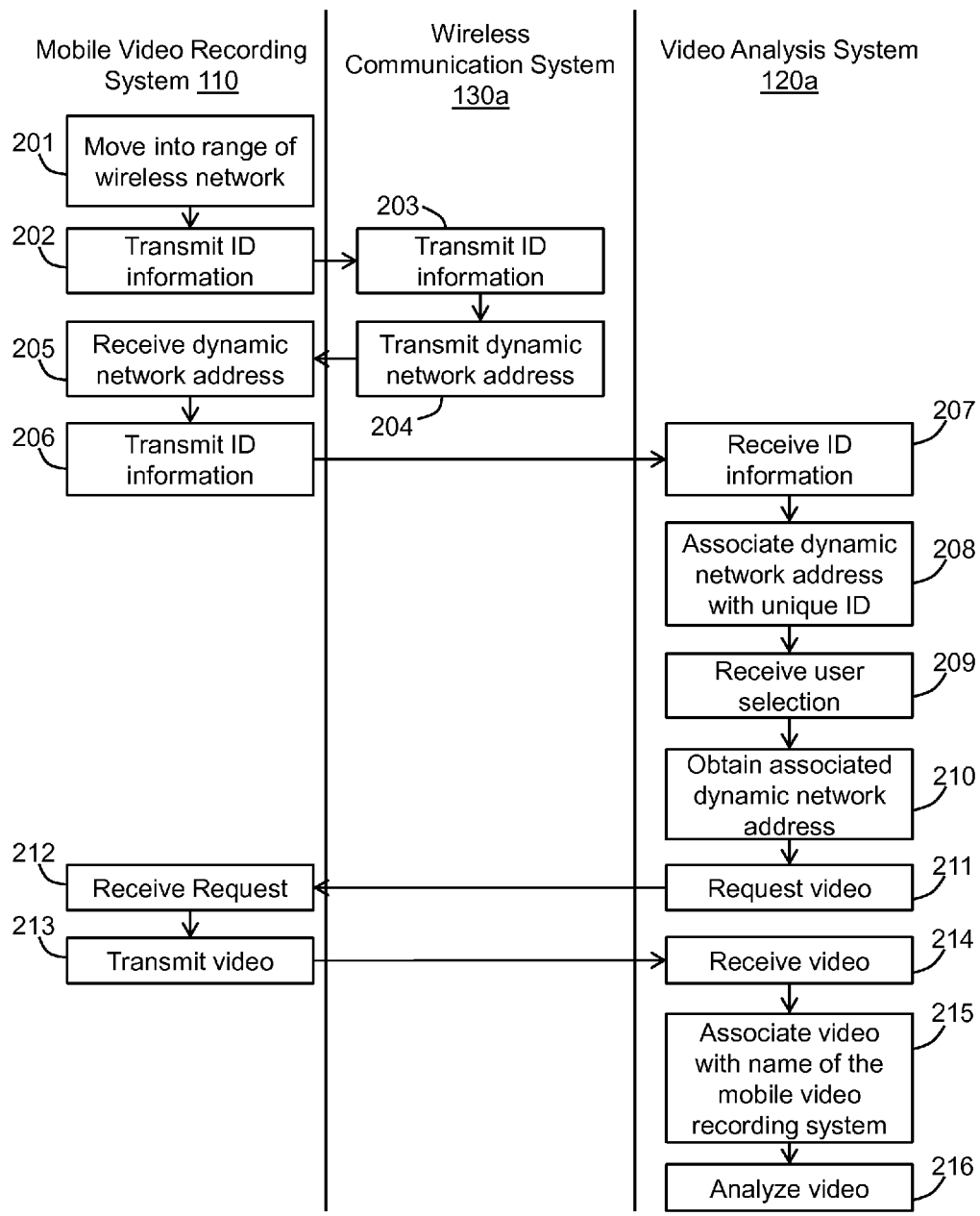
FIG. 2 illustrates a diagram of a method for transferring and storing video from a mobile video recording system to a video analysis system according to an embodiment of the invention.

Referring to FIG. 2, when the mobile video recording system 110 moves into range of another wireless network, such as the wireless communication system 130b of FIG. 1, the process of transmitting identification information (blocks 202 and 203) and transmitting a new dynamic network address (block 204) are repeated with each separate wireless communication system.

While embodiments of the invention have been described with respect to FIGS. 1 and 2, it is understood that these figures are provided only to illustrate example embodiments, and embodiments of the invention encompass variations of the systems and methods shown, including systems and methods having additional components and fewer components. For example, while FIG. 1 illustrates a mobile video recording system 110 having one camera 111, one video receiver 112, one video storage 114, one block of device data 114 and one wireless transmitter/receiver 117, embodiments of the invention encompass mobile video recording systems having any number of these components. In an embodiment in which the components are installed in a vehicle, the vehicle may include multiple cameras and multiple DVR devices, and each DVR device may have a separate unique identifier, such as a name, and each may be assigned a separate dynamic network address.

In addition, while embodiments of the invention have been described with respect to video recording, analysis and transmission, embodiments of the invention also encompass audio recording, analysis and transmission. The audio may be transmitted together with video, or the audio may be recorded, transmitted and analyzed with no video.

According to embodiments of the invention, a video analysis system, computer or software run on the system or computer provides to the user or system a list of names of mobile video (or audio) recording or storage devices. As the mobile video or audio recording or storage devices come into communication with different wireless communication systems over the course of time, the mobile video or audio recording or storage devices are provided with a dynamic network address corresponding to the wireless communication system to which the mobile video or audio recording or storage device is presently connected. The video analysis system, computer or software associates the current dynamic network address with the name of the mobile video or audio recording or storage device. A user or system may select the name of the mobile video or audio recording or storage device, and the video analysis system, computer or software automatically accesses the associated dynamic network address to permit communication with the mobile video or audio recording or storage device without the need for a user to remember a dynamic network address, without the use of a DNS server and without the use of a static network address for the mobile video or audio recording or storage device.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A video analysis system, comprising:
memory having stored therein video analysis software; and
a processor configured to execute the video analysis software to receive from a mobile video system a dynamic network address, to associate the dynamic network address with a unique identifier of the mobile video system in the memory, and to communicate with the mobile video system using the dynamic network address based on selection by a user of the unique identifier;
wherein the processor is configured to receive from the mobile video system a different dynamic network address each time the mobile video system communicates with the video analysis system via a different wireless communication system;
wherein the memory has stored therein a table to associate multiple unique identifiers of multiple mobile video systems with different dynamic network addresses corresponding to the multiple mobile video systems;
wherein a wireless communication system receives the unique identifier and a request for a dynamic network address, the wireless communication system assigning the dynamic network address to the unique identifier without accessing a domain name system (DNS) server;

wherein the processor receives the dynamic network address and the unique identifier from the mobile video system, the processor populating the table associating the unique identifier of the mobile video system with the dynamic network address corresponding to the mobile video system without accessing a domain name system (DNS) server.

2. The video analysis system of claim 1, wherein the mobile video system includes a digital video recorder (DVR) connected to a camera installed in a vehicle, the DVR configured to record video from the camera and transmit the video to the video analysis system.

3. The video analysis system of claim 1, wherein the video analysis system does not associate the mobile video system with a static network address that is the same for different wireless communication systems.

4. The video analysis system of claim 1, wherein the unique identifier is a device characteristic and the processor is configured to generate a visual user interface of device characteristics of each mobile video system connected to a same wireless communication system as the video analysis system, and the processor is configured to communicate with the mobile video system using the dynamic network address based on selection by a user of the device characteristic of the mobile video system.

5. A method for associating devices of a video transmission system, comprising:

receiving from a mobile video recording system a first dynamic network address and a unique identifier of the mobile video recording system;

associating the first dynamic network address with the unique identifier in a video analysis system;

receiving video at the video analysis system from the mobile video recording system; and associating the video with the unique identifier in memory;

wherein the receiving from the mobile video recording system the first dynamic network address comprises receiving a different dynamic network address each time the mobile video system communicates with the video analysis system via a different wireless communication system;

wherein associating the first dynamic network address with the unique identifier comprises storing a table to associate multiple unique identifiers of multiple mobile video systems with different dynamic network addresses corresponding to the multiple mobile video systems;

wherein a wireless communication system receives the unique identifier and a request for a dynamic network address, the wireless communication system assigning the dynamic network address to the unique identifier without accessing a domain name system (DNS) server;

wherein associating the first dynamic network address with the unique identifier includes receiving the dynamic network address and the unique identifier from the mobile video system, the processor populating the table associating the unique identifier of the mobile video system with the dynamic network address corresponding to the mobile video system without accessing a domain name system (DNS) server.

6. The method of claim 5, wherein associating the first dynamic network address with the unique identifier includes replacing a second dynamic network address with the first dynamic network address, the second dynamic network address corresponding to a different wireless communications system than the first dynamic network address.

7. The method of claim 5, further comprising:

receiving from the mobile video recording system one of a unicast signal, a multicast signal, and a broadcast signal indicating that the first mobile video recording system is connected to a same wireless communications system as the video analysis system, wherein the one of a unicast signal, a multicast signal, and a broadcast signal includes the first dynamic network address and the unique identifier.

8. The method of claim 5, further comprising:

analyzing, by the video analysis system, the content of the video.

9. The method of claim 5, further comprising:

detecting a user input selecting the unique identifier; and communicating with the mobile video recording system via a wireless communication system using the first dynamic network address.

10. The method of claim 5, wherein the mobile video recording system includes a camera and digital video recorder mounted in a vehicle to capture and store video images.

11. A method for associating devices of a video transmission system, comprising:

receiving from a mobile video recording system a dynamic network address and a unique identifier of the mobile video recording system;

associating, with a video analysis system, the dynamic network address with the unique identifier in a video analysis system;

detecting, by the video analysis system, a user selection of the unique identifier; and initiating communications with the mobile video recording system using the dynamic network address based on detecting the user selection of the unique identifier;

wherein the receiving from the mobile video recording system the first dynamic network address comprises receiving a different dynamic network address each time the mobile video system communicates with the video analysis system via a different wireless communication system;

wherein associating the first dynamic network address with the unique identifier comprises storing a table to associate multiple unique identifiers of multiple mobile video systems with different dynamic network addresses corresponding to the multiple mobile video systems;

wherein a wireless communication system receives the unique identifier and a request for a dynamic network address, the wireless communication system assigning the dynamic network address to the unique identifier without accessing a domain name system (DNS) server;

wherein associating the first dynamic network address with the unique identifier includes receiving the dynamic network address and the unique identifier from the mobile video system, the processor populating the table associating the unique identifier of the mobile video system with the dynamic network address corresponding to the mobile video system without accessing a domain name system (DNS) server.

12. The method of claim 11, wherein the unique identifier is a device characteristic associated with the mobile video recording system, and
the detecting of the user selection of the unique identifier includes providing a visual display to the user of a list of device characteristics of each mobile video recording system in communication with a same wireless communication system as the video analysis system.

* * * * *